United States Patent [19]

Yamamoto et al.

[11] Patent Number: 5,534,758

[45] Date of Patent: Jul. 9, 1996

[54] OPTICAL DISK DRIVE CIRCUIT AND OPTICAL DISK DRIVE DEVICE USING THE SAME

[75] Inventors: Seiichi Yamamoto; Shinichi Hashimoto, both of Kyoto, Japan

[73] Assignee: Rohm Co., Ltd., Kyoto, Japan

[21] Appl. No.: 277,759

[22] Filed: Jul. 20, 1994

[30] Foreign Application Priority Data

Jul. 29, 1993 [JP] Japan ................................. 5-207129

[51] Int. Cl.$^6$ ................................................ H02P 1/58
[52] U.S. Cl. ........................ 318/112; 318/293; 318/54
[58] Field of Search ........................... 318/54, 65, 102, 318/103, 111, 112, 293, 625, 626

[56] References Cited

U.S. PATENT DOCUMENTS 4,638,222  1/1987  Sawaki ........................ 318/111
4,670,693  6/1987  Kazami et al. .................. 318/112

Primary Examiner—Bentsu Ro
Attorney, Agent, or Firm—Fay, Sharpe, Beall, Fagan, Minnich & McKee

[57] ABSTRACT

The present invention resides in that two of three drivers are BTL-operated in pair to drive the motor for driving the tray and one of the two drivers and a remaining one driver are BTL-operated in pair to drive the other motors. Therefore, it is possible to construct a driver circuit for driving various drive motors within an optical disk drive device by adding only one driver to a conventional driver circuit and, thus, it becomes possible to make the drive circuit as a single chip IC.

3 Claims, 3 Drawing Sheets

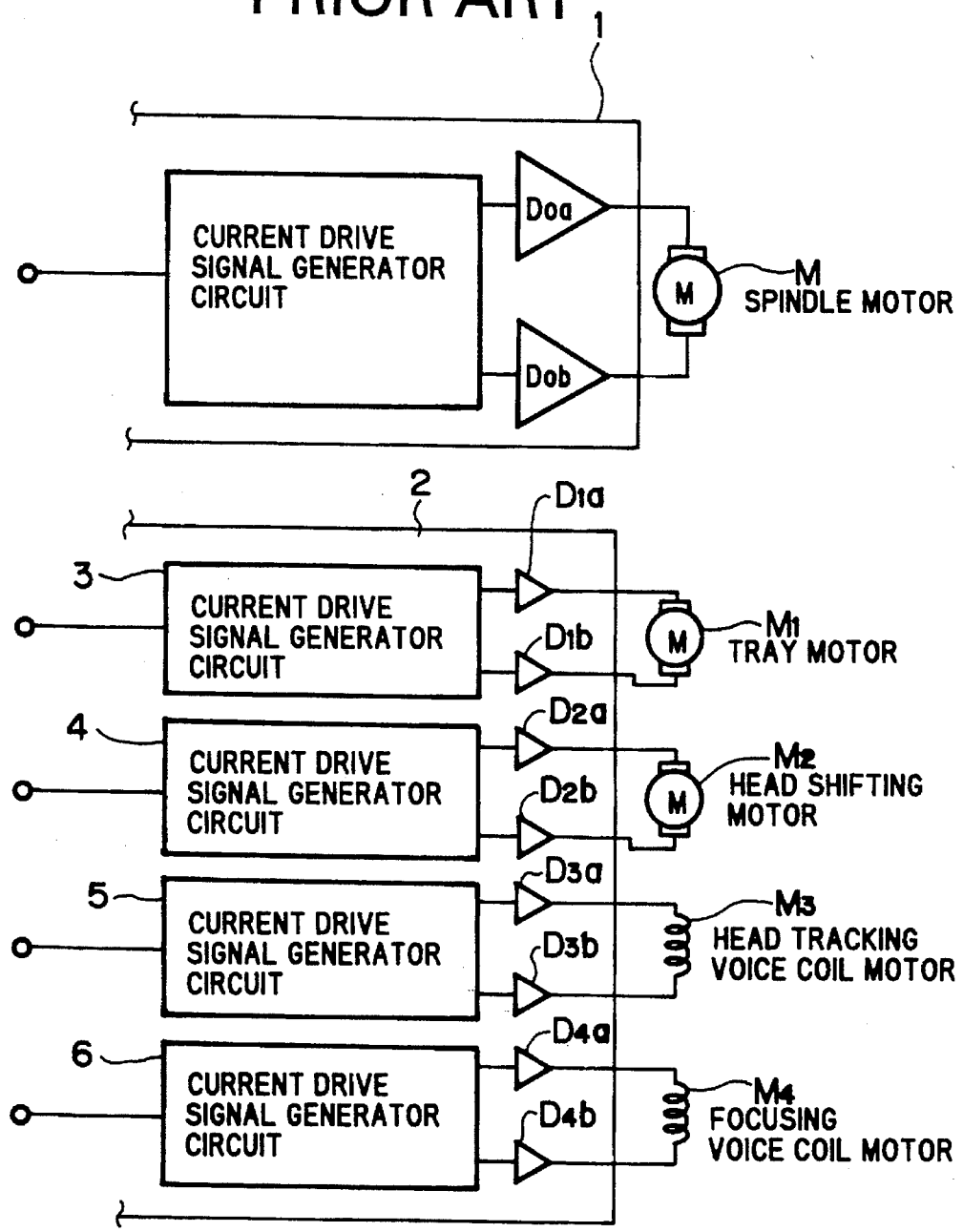

OPTICAL DISK DRIVE CIRCUIT AND OPTICAL DISK DRIVE DEVICE USING THE SAME

TECHNICAL FIELD

The present invention relates to an optical disk drive circuit and an optical disk drive device using the same and, particularly, to an improvement of a drive circuit for driving various internal motors in an optical disk drive device such as a motor for driving a tray on which an optical disk is to be mounted in order to automatically insert or derive the optical disk with respect to the device and a motor for rotating the optical disk in an optical disk player in order to reproduce an information recorded on the optical disk such as CD (compact disk), CD-ROM, CD-I (compact disk interactive, interactive type compact disk), MD (mini disk), LD (laser disk) and for making the drive circuit easy to be constructed as a one-chip IC.

BACKGROUND ART

It is general, in the past, to construct a player of an optical disk such as CD, MD or LD, etc., such that a tray on which the optical disk is mounted is transported to a spindle position in the player. The spindle rotates the optical disk through the tray to perform a data read operation. In reading data recorded on the optical disk, operations with respect to the disk set in a read position, including focusing of a laser light onto a surface of the optical disk, tracking the optical disk with an optical head and shifting of the optical head radially of the disk, etc., are usually performed by controlling various drive motors and voice coil motors.

Therefore, a number of motors and a number of drivers for driving these motors are included in the device.

As an example, conventional drivers for a CD player are shown in FIG. 4. In FIG. 4, two driver ICs, that is, a power operational amplifier IC1 including spindle motor drivers D0a and D0b for rotating the optical disk and a power operational amplifier IC2 including four pairs of BTL (balanced transformer-less) divers D1a and D1b, D2a and D2b, D3a and D3b and D4a and D4b are provided. Reference numerals 3, 4, 5 and 6 depict current drive signal generator circuits each of which responds to an input drive signal to generate a current drive signal having phase different from the input drive signal by 180° and sends them to a corresponding BTL driver set.

The BTL drivers D1a and D1b drive a tray motor M1 for moving the tray, the BTL drivers D2a and D2b drive a head shifting motor M2, the BTL drivers D3a and D3b drive a head tracking voice coil motor M3 and the BTL drivers D4a and D4b drive a focusing voice coil motor M4. The BTL drivers in each set operate in opposite phase to each other and the motors M, M1 and M2 are usually DC motors or single phase brushless motors.

As to an optical disk player for such as CD or MD, miniaturization thereof is required since it is incorporated in a micro component stereo device or is used as a portable device. Further, as to a drive device for optical disk such as CD-ROM, etc., miniaturization thereof is also required so that it can be used as a peripheral device of a personal computer of notebook type. Therefore, there is a requirement of constructing such driver circuit as a single chip IC. However, since size of a driver circuit tends to be increased with new functions to be given to the drive device, it becomes difficult to make it as one chip IC.

SUMMARY OF THE INVENTION

An object of the present invention is to provide a driver circuit for an optical disk which can be motor-driven as in a conventional drive circuit and can be easily constructed as a single chip IC even with a reduced number of drivers.

Another object of the present invention is to provide an optical disk driver which incorporates the driver circuit therein and is suitable to be miniaturized.

Features of the driver circuit for an optical disk according to the present invention which achieves such objects are that it comprises a first, a second and a third drivers, that a motor for driving a tray which mounts an optical disk thereon to and fro by operating the first and second drivers in opposite phase to each other while an operation of the third driver is stopped and that other motors housed in the device than the above mentioned motor is driven by operating the second and third drivers in opposite phase to each other while an operation of the first driver is stopped.

In the optical disk drive device, it is usual that, prior to a start of play, the tray mounting the disk is driven and the tray is driven again after the play ends. Therefore, the driving period of the motor for driving the tray is not overlapped with drive periods of the other motors for driving a spindle, focusing, tracking an optical head and shifting the optical head radially of the disk. That is, the operation of the tray is independent from drive operations of other internal mechanisms.

In view of this, two of three drivers are BTL-operated in pair to drive the motor for driving the tray and one of the two drivers and a remaining one driver are BTL-operated in pair to drive the other motors. Thus, since the other motors are stopped during the period in which the tray is driven, the drivers used commonly are not operated simultaneously.

Thus, the number of drivers is reduced by one compared with the conventional art in which four drivers are required. Therefore, it is possible to construct a drive circuit for driving various drive motors in the internal mechanisms of the optical disk drive device by merely adding only one driver to the driver circuit IC2 shown in FIG. 4. Since an increase of circuit size due to addition of one driver circuit is not significant compared with an integration area of an IC, it becomes possible to make the whole driver circuit including other drive circuit housed in the IC2 shown in FIG. 4 as a one-chip IC.

BRIEF DESCRIPTION OF THE DRAWINGS

FIG. 4 is a block diagram of a driver circuit of a conventional CD player.

DESCRIPTION OF THE PREFERRED EMBODIMENT

Figure 1:
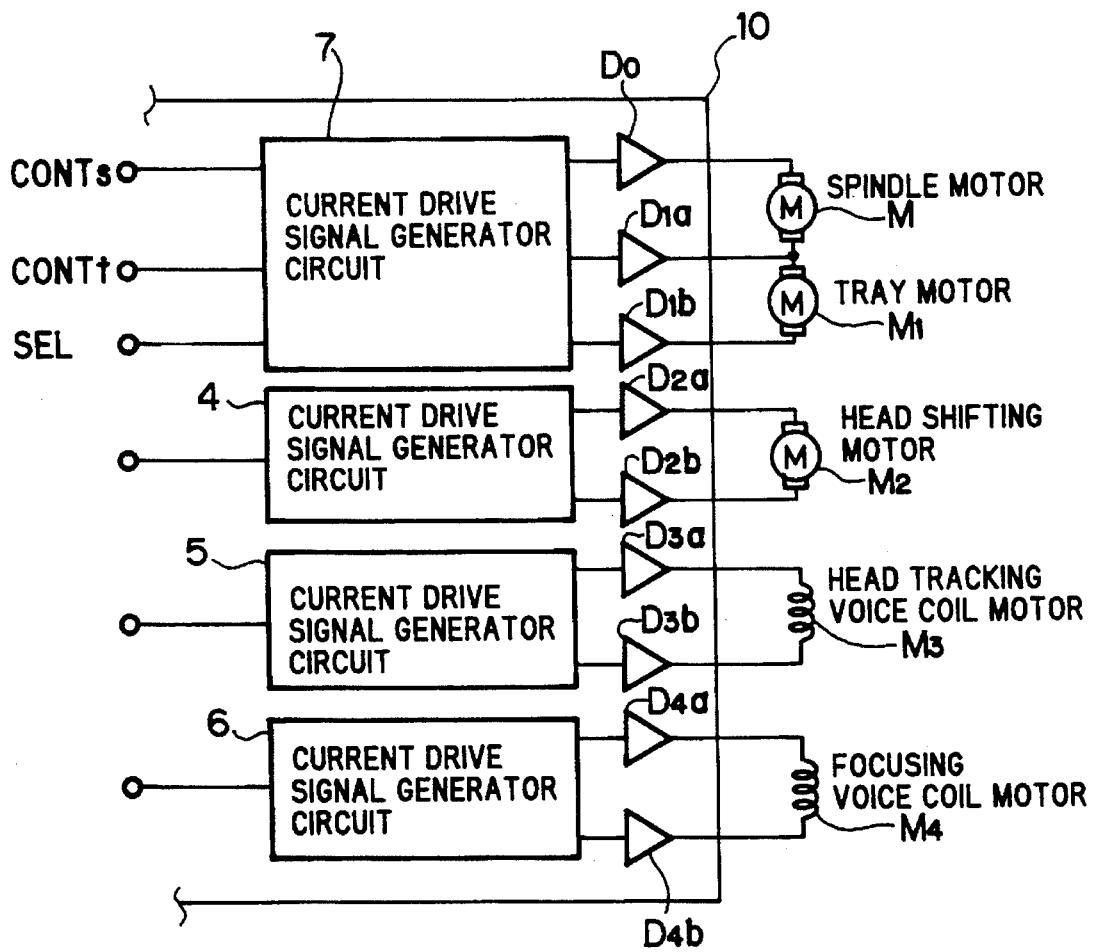
FIG. 1 is a block circuit of a driver circuit portion of a CD player according to an embodiment to which a driver circuit of an optical disk according to the present invention.

In FIG. 1, 10 is a one-chip IC in which one driver D0 is added to the driver of the IC2 in FIG. 4. And 7 is a current drive signal generator circuit which generates a drive current signal for driving a BTL driver of a spindle motor M composed of drivers D0 and D1a and a drive current signal for driving BTL driver of a tray motor M1 composed of drivers D1a and D1b, in response to a selection signal SEL. Here, M, M1 and M2 are DC motors whose rotational direction are reversed by switching current flowing direction. This is applicable to forward and backward movement of a voice coil motor. As to the spindle motor M which rotates in only one direction, a single phase motor may be used. Each of the BTL drivers is usually constructed with a push-pull current output circuit and current flowing through the motor becomes forward and backward since they operate in opposite phases so that one of them becomes current discharge side and the other of them becomes current receiving side.

Figure 2A:
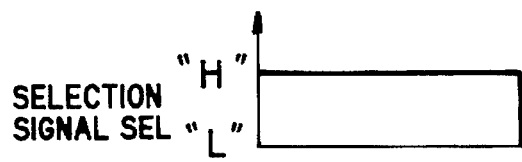
FIGS. 2(a)–2(c) are timing charts showing the driving timing of a tray motor and a spindle motor thereof.
Figure 2B:
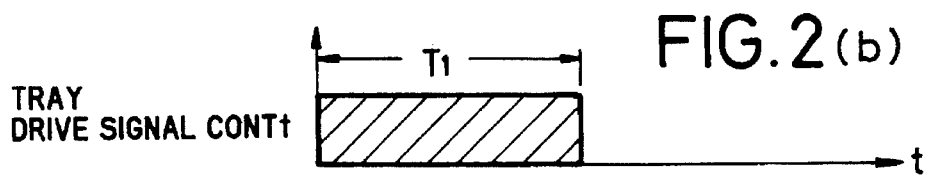
Figure 2C:
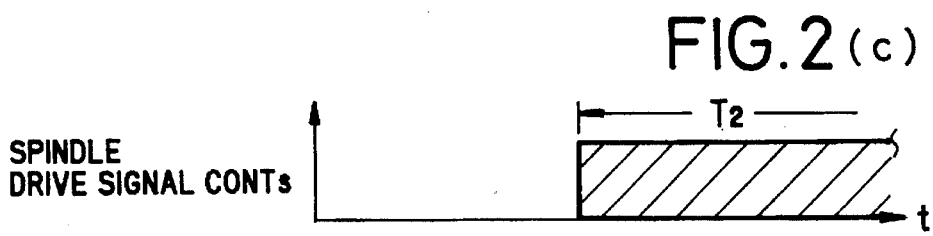

As shown in FIGS. 2(a)–2(c), during a tray drive period T1, the selection signal SEL becomes HIGH level (referred to "H" hereinafter. See FIG. 2(a)) with which the driver D0 is made "OFF" state and the driver D1b becomes "ON". A tray drive signal CONTt is input and the tray motor M1 is driven by the BTL driver composed of the drivers D1a and D1b (see hatched portion in FIG. 2(b)). And, then, during a spindle drive period T2, the selection signal becomes LOW level (referred to "L" hereinafter, see FIG. 2(a)), so that the driver D1b is made "OFF" state and the driver D0 is made "ON" state. Therefore, a spindle drive signal CONTs is input and the spindle motor M is driven by the BTL driver composed of the drivers D0 and D1a (see hatched portion in FIG. 2(c)).

Therefore, it is possible to drive the spindle motor by providing only one driver D0 and, so, a one-chip IC driver circuit can be realized.

In this case, if, for example, a current capacity of the drivers for the spindle motor M is larger than that of the tray motor M1, the current capacity of the drivers D0 and D1a is set correspondingly thereto. By designing the drivers such that the larger capacity side is satisfied, when the drivers D1a and D1b operate, it becomes the BTL driver determined by the current of the driver D1b, so that it is possible to flow current necessary for drive of the tray motor M1. Thus, the problem of driving the both is solved. Since drive of drivers D1a, D2b, D3a, D3b, D4a, D4b is similar to conventional FIG. 4, it is omitted.

Figure 3:
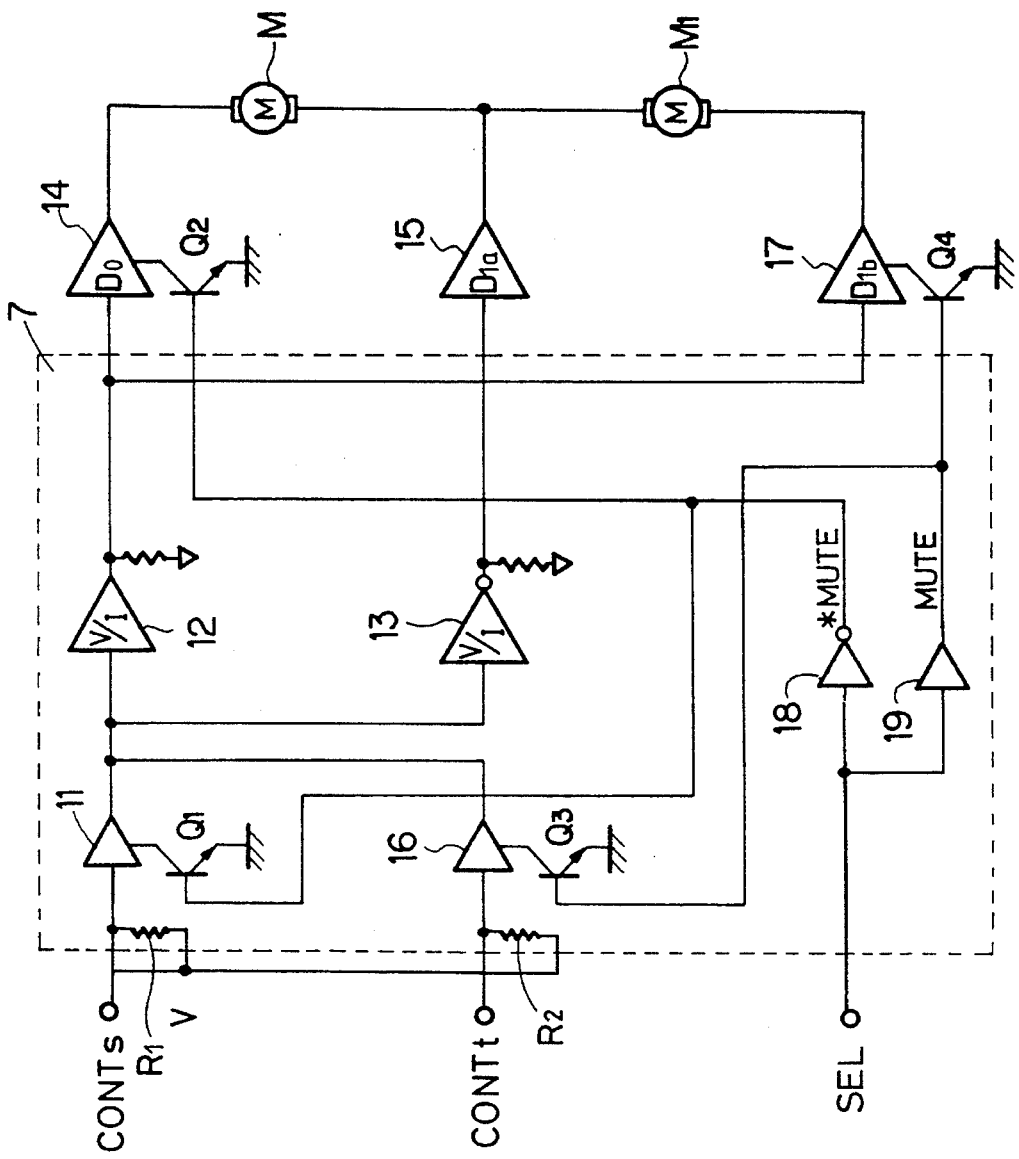
FIG. 3 is a block circuit diagram of a concrete example of the drivers for the spindle motor and the tray motor.

FIG. 3 shows an example of a concrete circuit construction of the current drive signal generator circuit 7 and the BTL drivers D0, D1a, D1b.

The spindle drive signal CONTs is input to a spindle signal amplifier 11, converted into drive signal by voltage/current (V/I) converter circuits 12, 13 and input to drivers (D0)14, (D1a)15 and a drive current is sent to the spindle motor M. Although a drive current signal of the V/I converter circuit 12 is also sent to a driver (D1b)17 simultaneously, this becomes invalid since a mute signal (MUTE) is "L" as to be described later and the driver 17 does not operate. The mute signal (MUTE) is the selection signal SEL amplified by a buffer amplifier 19 and a relation of "H", "L" thereof is the same as that of the selection signal SEL.

In this case, the V/I converter circuit 13 is an inverting amplifier circuit and operates inversely (inverting operation) with respect to the V/I converter circuit 12. Further, a transistor Q1 is a switch circuit which is turned "ON" to operate the spindle signal amplifier 11 when a mute inversion signal (*MUTE) which is the mute signal inverted is "H". A transistor Q2 is also a switch circuit which is turned "ON" to operate a driver 14 when the mute inversion signal (*MUTE) is "H". The mute inversion signal (*MUTE) is the selection signal SEL inverted and amplified by an inverting amplifier 18 and a relation "H", "L" thereof is inverted with respect to that of the selection signal SEL.

The spindle signal amplifier 11 and the tray signal amplifier 16 are usually constituted with operational amplifiers having input sides connected to a line of a bias VB through resistors R1, R2. This bias voltage VB is in an intermediate level between levels "H" and "L". This is, for example, "H" is substantially equal to a source voltage VDD and is VDD/2 when "L" is ground level. When the spindle drive signal CONTs or the tray drive signal CONTt is not input, the motors M, M1 connected to the respective drivers are not driven since, even if a voltage level of an input signal becomes VDD/2 and the respective drivers are in operating states, output voltages of the drivers 14, 15, 17 become equal.

When a signal "H" is input to the spindle signal amplifier 11, a drive current flows from the driver 14 to the motor M, the driver 15 and the DC motor M is rotated in forward direction at a predetermined speed. And, when a signal "L" is input to the spindle signal amplifier 11, a drive current flows from the driver 15 to the motor M, the driver 14 and the DC motor M is rotated in reverse direction at a predetermined speed. This inversion is utilized when the motor M, etc., is stopped. Although, in this case, the driver 17 does not operate, this will be described later.

Similarly, when a signal "H" is input to the tray signal amplifier 16, a drive current flows from the driver 17 to the motor M, the driver 15 and the DC motor M1 is rotated in forward direction at a predetermined speed and the tray is moved to a front side of the device. And, when a signal "L" is input to the tray signal amplifier 16, a drive current flows from the driver 15 to the motor M1, the driver 17 and the DC motor M1 is rotated in reverse direction at a predetermined speed. With this inversion, the tray returns to its original position, a disk is mounted and the disk on the tray is positioned in a loading position. Although, in this case, the driver 14 does not operate, this will be described next.

The tray drive signal CONTt is input to the tray signal amplifier 16 and supplied to the V/I converter circuit 12, the V/I converter circuit 13 by which it is converted into the drive signal. And, it is supplied to the driver 17, 15 and a drive current is supplied to the tray motor M1. The drive current signal of the V/I converter circuit 12 is also sent to the driver 14. At this time, the selection signal SEL has become "H". Thus, the mute signal (MUTE) has become "H" and a transistor Q4 is in ON state. The driver 17 operates and, since the mute inversion signal (*MUTE) is "L", a transistor Q2 is in OFF state and the driver 14 does not operate. This becomes invalid.

Although the spindle drive signal CONTs is supplied to the driver 14 and the driver 17 in this manner, the selection signal SEL is "L" at this time (see period T2 in FIG. 2). Thus, the mute inversion signal (*MUTE) is "H" and the transistor Q2 is in ON state. The driver 14 becomes in operation and, since the mute signal (MUTE) is "L", the transistor Q4 is in OFF state. Since the operation of the driver 17 is stopped thereby, only the signal of the driver 14 becomes effective. As a result, only the driver 14 and the driver 15 operate.

Although the tray drive signal CONTt is also supplied to the driver 14 and the driver 17, the mute signal (MUTE) becomes "H" and thus the driver 17 becomes in operation and the mute inversion signal (*MUTE) is "L" and thus the operation of the driver 14 is stopped since the selection signal SEL is "H" at this time (see period T1 in FIG. 2), and only the signal of the driver 17 becomes effective. As a result, only the driver 17 and the driver 15 operate.

In the circuit shown in FIG. 3, when the respective transistors Q1–Q4 constituting the switch circuits are turned "ON", the respective signal amplifiers 11, 16 and the respective drivers 14, 17 become in operation. However, it may be possible to stop operations of the respective signal amplifiers 11, 16 and the respective drivers 14, 17 by bypassing operating currents of the respective drivers when the respective transistors Q1–Q4 are turned "ON". In this case, the selection signal SEL is "L" in the period T1 and "H" in the period T2.

Alternately, it is possible to operate inversely with respect to "H", "L" of the input signal by driving the driver 15 by means of the V/I converter circuit 12 and driving the driver 14 and the driver 17 by means of the V/I converter circuit 13.

Further, although, in FIG. 3, the bias voltage is set at the intermediate value between "H" and "L" by providing the resistors R1, R2 on the input side of the signal amplifiers 11, 16, when these signal amplifiers are constituted with operational amplifiers, it is possible to apply the previously mentioned bias voltage to reference input terminals of the operational amplifiers.

What is claimed is:

1. An optical disk driver circuit comprising first, second and third drivers, wherein a motor for driving a tray which receives an optical disk to and fro by operating said first and second drivers in opposite phase to each other while an operation of said third driver is stopped and other motors housed in a device than the above mentioned motor is driven by operating said second and third drivers in opposite phase to each other while an operation of said first driver is stopped;

wherein, when said first driver is operated in response to an externally supplied selection signal, the operation of said third driver is stopped and said first and second drivers perform a BTL operation in response to a first input current signal and, when third driver is operated in response to said externally supplied selection signal, the operation of said first driver is stopped and said second and third drivers perform a BTL (balanced transformer-less) operation in response to a second input current signal;

a current drive circuit for generating said first input current signal in response to a first input voltage signal and said second input current signal in response to a second input voltage signal;

wherein said current drive circuit includes first and second voltage/current conversion circuits, said second voltage/current conversion circuit performing an inverting operation with respect to said first voltage/current conversion circuit and wherein one of said first and second voltage/current conversion circuits responds to said first input voltage signal to supply said first input current signal to said second driver and the other of said first and second voltage/current conversion circuits responds to said first input voltage signal to supply said first input current signal to said first and third drivers and one of said first and second voltage/current conversion circuits responds to said second input voltage signal to supply said second input current signal to said second driver and the other of said first and second voltage/current conversion circuits responds to said second input voltage signal to supply said second input current signal to said first and third drivers.

2. The optical disk driver circuit claimed in claim 1, wherein said current drive circuit comprises a first amplifier circuit for generating said first input voltage signal in response to a first control signal and a second amplifier circuit for generating said second input voltage signal in response to a second control signal and wherein each of said first and second control signals has a HIGH level and a LOW level and said first and second amplifier circuits have reference voltages equal to substantially an intermediate value between said HIGH level and said LOW level.

3. The optical disk driver circuit claimed in claim 2, wherein said first control signal controls a drive of a spindle, said second control signal controls a drive of said tray and wherein said first, second and third drivers and said current drive circuit are integrated as an IC.

\* \* \* \* \*